C. M. & J. FARTHING.
LOCK NUT.
APPLICATION FILED APR. 16, 1912.

1,148,370.   Patented July 27, 1915.

Witnesses
Carroll Bailey
Wm. J. Koerth

Inventors
Charles M. Farthing
John Farthing,
By Victor J. Evans
Attorney

UNITED STATES PATENT OFFICE.

CHARLES M. FARTHING AND JOHN FARTHING, OF WEISER, IDAHO, ASSIGNORS OF ONE-FOURTH TO GEORGE W. ALLEN, OF LOS ANGELES, CALIFORNIA, AND ONE-FOURTH TO HORACE FARTHING, OF WEISER, IDAHO.

LOCK-NUT.

1,148,370.   Specification of Letters Patent.   Patented July 27, 1915.

Application filed April 16, 1912.   Serial No. 691,106.

*To all whom it may concern:*

Be it known that we, CHARLES M. FARTHING and JOHN FARTHING, citizens of the United States, residing at Weiser, in the county of Washington and State of Idaho, have invented new and useful Improvements in Lock-Nuts, of which the following is a specification.

The present invention relates to improvements in nut locks.

In carrying out our invention it is our purpose to provide a bolt having a grooved face and a washer having the wall of its bore formed with a lug which is adapted to co-act with the grooved face of the bolt, the said washer being provided diametrically opposite the lug and adjacent its perimeter with an opening to provide a passage for a bendable metallic key, the said key when forced into the opening and through the passage being adapted to coil upon itself to provide a locking element which contacts with one of the sides of the nut to prevent the accidental removal of the nut from the bolt.

With the above recited objects in view and others of a similar nature which will be better understood as the nature of the improvement is developed, the invention resides in the novel construction, combination and operative arrangement of parts set forth in and falling within the scope of the appended claim.

Figure 1:
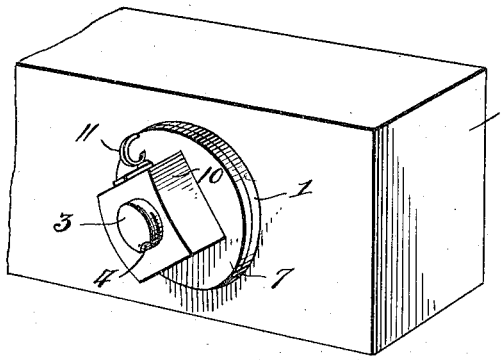
Figure 2:
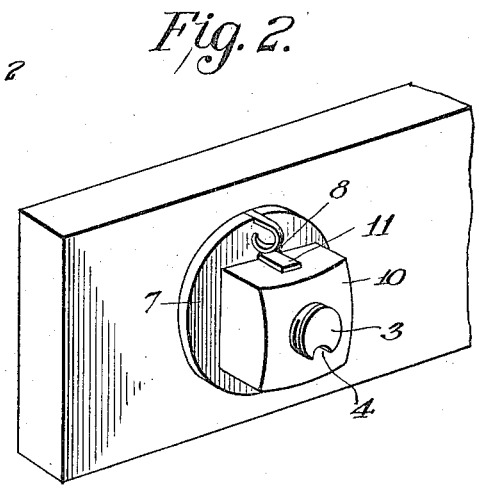
Figure 4:
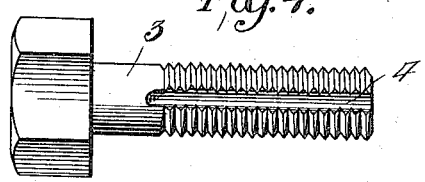
Figure 3:
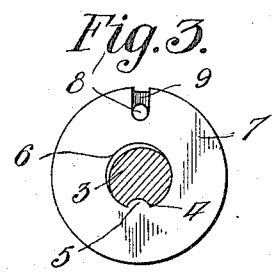
Figures 5, 6:
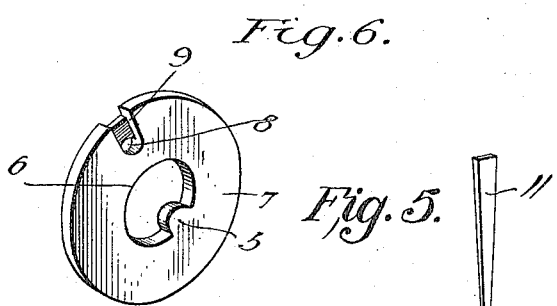

In the drawing, Figure 1 is a perspective view of my nut lock as applied to a wooden beam with the key in locking position. Fig. 2 is a similar view showing the nut lock applied to a metal plate. Fig. 3 is a transverse sectional view taken directly below the locking washer and looking toward the washer. Fig. 4 is a view of the bolt. Fig. 5 is a view of the key. Fig. 6 is a perspective view of the washer.

In Fig. 1 of the drawing our improvement has been shown in applied position upon a wooden beam, in which instance we employ an auxiliary washer or other metallic member which is designated by the numeral 1. It may here be stated that the said washer 1 is only employed as a guide for directing the key of the device, and when the nut lock is employed upon iron or metallic beams, as illustrated in Fig. 2 of the drawing, the washer 1 is dispensed with.

The beams 2 are provided with suitable openings for the reception of the threaded stem of a bolt 3. The said threaded stem of the bolt is longitudinally provided with a grooved portion 4, and this grooved portion is adapted to serve as a seat for a lug 5 which projects into the bore 6 of a washer 7. The washer 7 is provided, adjacent its perimeter and preferably diametrically opposite its tongue with a perforation 8 and the under face of the washer from its perimeter is channeled to provide a passage 9, which communicates with the perforation 8. The perforation is arranged a distance away from the bore of the washer and from the threaded shank of the bolt sufficient to be partially closed by the nut when the same is screwed home upon the bolt. The numeral 10 designates the nut which is adapted to coöperate with the threaded stem of the bolt, and the numeral 11 designates what we term the locking key for the device. This key is constructed of a single piece of bendable metal, such as malleable iron or the like, and the said key is of a thickness equaling the depth of the passage 9 and the body portion of the key is of a width corresponding with the width of the said passage. The key preferably has its entering end pointed, and when the key, in its flattened position, is forced within the perforation, a smart blow of a hammer upon its opposite end will cause the said end to pass through the passage and to coil upon itself and against one of the flattened sides or faces of the nut as clearly illustrated in Figs. 1 and 2 of the drawing. It will be noted that the perforation 8 as well as the passage 9 are arranged diametrically opposite the lug 5 of the washer, as heretofore stated, and it will further be noted that when the malleable key 11 is forced through the perforation and against one of the faces of the nut, the said key will have a tendency to force the lug 9 tightly into the groove 4 of the bolt, so that the nut and bolt are effectively locked both by the key and by the lug of the washer.

When it is desired to remove the nut from the bolt the coiled or curved end of the key may be straightened by the employment of a suitable instrument and the opposite end engaged by pinchers or the like, when an outward pull will draw the said key from the passage and perforation of the washer.

While the device has been illustrated in connection with beams it is to be understood that the same is not to be limited in its useful application to such structure, and the nut lock may be effectively employed in sustaining the fish plates upon the meeting ends of rails as well as various other devices.

Having thus described the invention, what we claim is:—

In a nut lock, the combination of a bolt having its shank provided with a longitudinally extending groove and a nut for the bolt, of a washer arranged upon the shank of the bolt and contacted by the nut, said washer having an inturned lug that is received within the groove of the bolt, the washer being further provided with a perforation arranged diametrically opposite the lug and which is parallel with one of the sides of the nut, the inner face of the washer being formed with an outwardly arranged passage which communicates with the perforation and with the edge of the washer, a malleable wedge-shaped key inserted in the perforation of the washer and through the passage with its reduced end extending over the outer face of the washer, substantially as and for the purpose set forth.

In testimony whereof we affix our signatures in presence of two witnesses.

CHARLES M. FARTHING.
JOHN FARTHING.

Witnesses:
WM. F. KLOTZ,
JOHN W. CAGE.

Copies of this patent may be obtained for five cents each, by addressing the "Commissioner of Patents, Washington, D. C."